United States Patent [19]

Maisonneuve

[11] Patent Number: 4,665,813
[45] Date of Patent: May 19, 1987

[54] EGGSHELL CRACKING DEVICE

[76] Inventor: Michel Maisonneuve, 3505 Dezéry Street, Montreal, Province of Quebec H1W 2S8, Canada

[21] Appl. No.: 826,574

[22] Filed: Feb. 6, 1986

[51] Int. Cl.$^4$ .............................................. A47J 43/14
[52] U.S. Cl. ........................................ 99/571; D7/98; 30/120.1; 99/499; 99/568; 225/93
[58] Field of Search .................. 99/495–500, 99/568, 567; 30/120.1, 123; D7/98, 99, 106, 46, 38, 381; 225/93

[56] References Cited

U.S. PATENT DOCUMENTS 1,030,346  6/1912  Svensson et al. ............... 99/499
2,460,887  2/1949  Kriz, Jr. .
2,706,507  4/1955  Bartell .
3,179,322  4/1965  Larson ......................... 99/498 X
3,494,397  2/1970  Sparks .

Primary Examiner—Timothy F. Simone

[57] ABSTRACT

A rigid telescopic bar mounted over a pan, or a pot, for cracking eggshells by striking the latter against the bar. The bar comprises a sleeve portion, a stem slidably engaged in the sleeve portion, and hook members for securing the outer ends of the stem and sleeve portion to opposite portions of the side wall of the pan. The hook members are joined to the ends of the bar by universal joints to suit various outward inclinations of the side wall of the pan and to permit securing the bar over a selected zone of the pan bottom. Extension/retraction of the stem through the sleeve portion allows the device to adapt to pans, or pots, of various widths.

4 Claims, 6 Drawing Figures

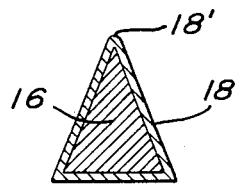
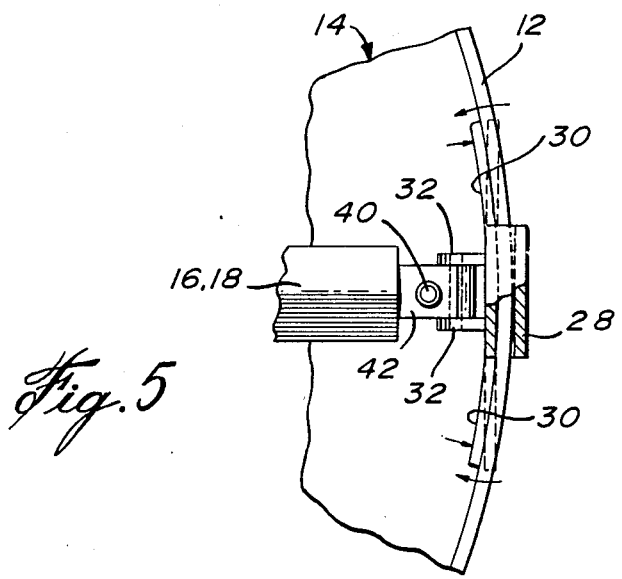
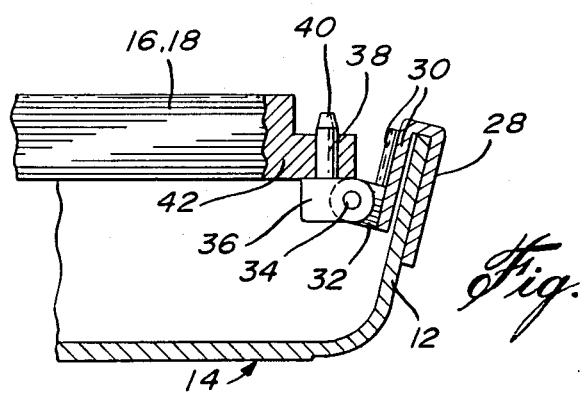

EGGSHELL CRACKING DEVICE

FIELD OF THE INVENTION

The invention pertains to eggshell crackers.

BACKGROUND OF THE INVENTION

When one wants to crack the eggshell of an uncooked egg for cooking same in a pan or pot, one usually strikes the eggshell against the edge of a hard object, such as the corner of a kitchen counter, or the top edge of the side wall of a pan in which the content of the egg is to be poured, or he also may use a tool, such as a knife, to break the eggshell. Messy spill-overs may occur.

The prior art discloses eggshell cracker tools specifically constructed for that purpose. All these tools require both the cracking proper of the eggshell, and the pouring of the content thereof into the pan. As of now, the wide variety of shapes of pans have precluded the introduction of a device which would allow a user to break the eggshell directly over the pan without requiring a subsequent pouring operation.

OBJECTS OF THE INVENTION

The gist of this invention is to provide a device to simplify the cracking of eggshells and pouring of the content thereof into a pan or pot.

A corollary object of the present invention is to provide a device that is adaptable to a wide variety of shapes of pans or pots.

SUMMARY OF THE INVENTION

Accordingly with the stated objects of the invention, there is disclosed a device for permitting the cracking of eggshells over a cooking pan or pot and similar receptacle having a side wall. The device includes a bar which preferably consists of first and second elongated rigid members, interconnected in telescopically-slidable fashion for length adjustment of the device relative to the pan or pot. Hook members releasably secure the outer ends of said bar to opposite portions of the side wall of the pot or pan. Each of the hook members is connected to an outer end of the bar by a universal joint to allow for various inclinations of the receptacle side wall and to permit securing the bar over a selected zone of the receptacle bottom.

BRIEF DESCRIPTION OF THE DRAWINGS

FIGS. 3 and 4 are cross-sectional views taken along lines 3—3 and 4—4, respectively, of FIG. 2;

FIG. 5 is a partly-sectional top plan view of the end portion of said device, and of a broken adjacent portion of the pan; and FIG. 6 is a partly sectional side elevation of the elements shown in FIG. 5.

DETAILED DESCRIPTION OF THE PREFERRED EMBODIMENT OF THE INVENTION

Figure 1:
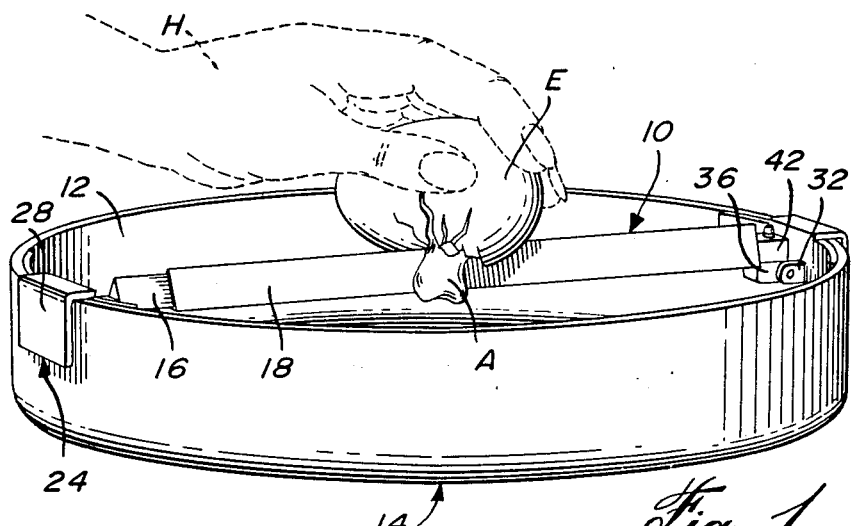
FIG. 1 is a downwardly-looking perspective view of a cooking pan provided with a device for cracking eggshells according to the invention, and showing a hand in dotted lines holding an egg and striking the latter against the said device.
Figure 2:
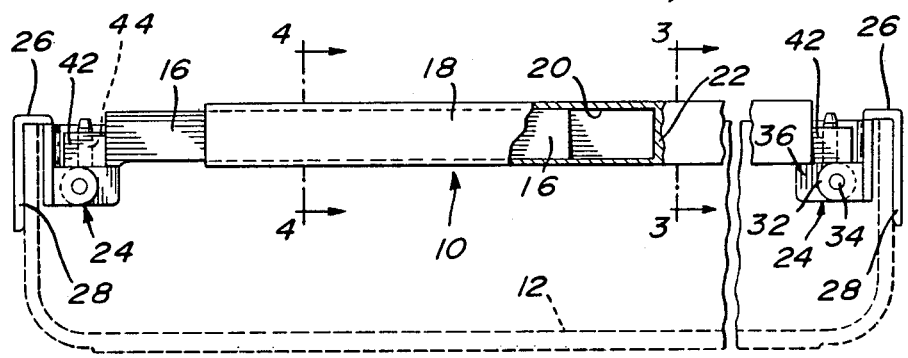
FIG. 2 is a side elevation, partially in section, of said device, secured to a pan shown in dotted lines.

In FIG. 1, a device 10 for cracking thereon with a hand H the shell of an egg E, is secured to the side wall 12 of a pan 14. The device 10 includes elongated rigid full bar 16 and relatively elongated larger rigid sleeve 18, both of triangular cross-section. Sleeve 18 comprises a hollow portion 20 and a full reinforcing portion 22, whereby the inner end of bar 16 is engaged into hollow 20 and is slidable through the inner end of the sleeve. The outer ends of bar 16 and sleeve 18 are releasably secured to opposite portions of wall 12 by similar hook members 24 connected to the bar and to the sleeve.

Each hook member 24 consists of an inverted U-shape hook plate 26, engaging the top portion of wall 12 and defining an outer leg 28 and an inner leg 30 slightly shorter in height but much larger in width than the outer leg 28, see FIGS. 5 and 6. At least leg 30 is flexible radially relative to the pan. Leg 30 has two transversely-spaced flanges 32 radially inwardly projecting and interconnected by a transverse pin 34. A block 36 is rotatively mounted to pin 34 between flanges 32 and includes an upright pivot pin 38 having a conical head 40 and normal to pin 34. The outer ends of bar 16 and sleeve 18 each include a lower projection 42 having a vertical through-bore 44, preferably releasably engaged by pivot pin 38. Thus, flange 32, pins 34, 38, block 36 and projection 42 form a universal joint; bar members 16, 18 are removable from hook members 24, which may remain secured to the pan during cooking of the egg(s).

Therefore, the device 10 is adjustably secured to side wall 12, being suitable for various widths of pans 14, by extending/retracting bar 16 from sleeve 18; for various curvatures of wall 12, since leg 30 is radially flexible (see the arrows in FIG. 5); and for various inclinations of the wall 12, whether the latter is upright or outwardly divergent. The bar device 10 also need not be positioned over the center of the pan bottom, but can be positioned along a sector line of the circular bottom.

Figure 3:
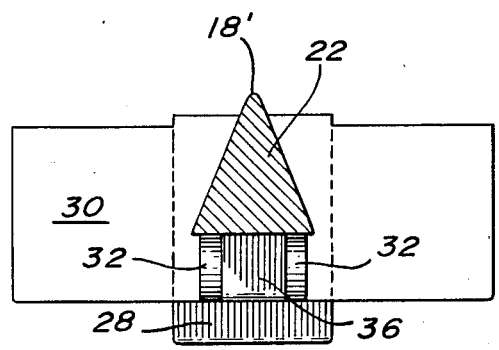

It is preferable, as shown in FIGS. 1 and 3, that the cross-sectionally triangular sleeve 18 has one of its corner as its top edge, at 18', to facilitate cracking of the egg E by striking the latter thereagainst, as well as to direct the diverging flow of albumin A along the adjacent downwardly-radially-outwardly diverging walls of the sleeve.

I claim:

1. A device for permitting the cracking of egg-shells directly over a receptacle, the latter having a side wall; said device including a cross-sectionally triangular bar member consisting of two telescopic sections, and hook members for releasably securing the outer ends of said bar member to opposite portions of said side wall; and a universal joint connecting each of said hook members to an outer end of said bar member; wherein each of said hook members comprises an inverted U-shape hook plate, defining inner and outer legs for releasably engaging the top portion of the receptacle side wall; each universal joint including two transversely-spaced flanges inwardly extending from said hook plate inner leg; a block mounted for pivotal movement in between said flanges about a first pivot pin carried by said flange; a second pivot pin upstanding from said block and normal to said first pivot pin; each outer end of said bar member having a bore for rotatably receiving said second pivot pin.

2. The device as defined in claim 1, wherein the hook plate outer leg is longer than its inner leg.

3. The device of claim 1, wherein said bar member is removable from each of the second pivot pins.

4. The device as defined in claim 1, wherein the hook plate inner leg is wider than its outer leg and is made of flexible material.

* * * * *